United States Patent
Hooks et al.

(10) Patent No.: US 8,707,427 B2
(45) Date of Patent: Apr. 22, 2014

(54) AUTOMATED MALWARE DETECTION AND REMEDIATION

(75) Inventors: David E. Hooks, Cary, NC (US);
Mitchell N. Quinn, Raleigh, NC (US)

(73) Assignee: Triumfant, Inc., Research Triangle, NC (US)

( * ) Notice: Subject to any disclaimer, the term of this patent is extended or adjusted under 35 U.S.C. 154(b) by 238 days.

(21) Appl. No.: 12/754,814

(22) Filed: Apr. 6, 2010

(65) Prior Publication Data

US 2011/0247071 A1 Oct. 6, 2011

(51) Int. Cl.
*G06F 21/00* (2013.01)
*H04L 29/06* (2006.01)

(52) U.S. Cl.
USPC .............................................. 726/22; 726/24

(58) Field of Classification Search
USPC .......................................................... 726/24
See application file for complete search history.

(56) References Cited

U.S. PATENT DOCUMENTS

| | | |
|---|---|---|
| 2004/0064438 A1 | 4/2004 | Kostoff |
| 2005/0038827 A1 | 2/2005 | Hooks |
| 2005/0278777 A1* | 12/2005 | Loza ................................ 726/4 |
| 2007/0143843 A1 | 6/2007 | Nason et al. |
| 2008/0060071 A1 | 3/2008 | Hennan et al. |
| 2010/0005339 A1 | 1/2010 | Hooks |
| 2010/0043072 A1 | 2/2010 | Rothwell |

OTHER PUBLICATIONS

PCT International Search Report and the Written Opinion, PCT/US2011/027134, Apr. 27, 2011, 10 pages.
European Search Report, EP11766326, Dec. 4, 2013, 8 pages.
"Layered Service Provider", Wikipedia, the free encyclopedia, Mar. 14, 2010, pp. 1-3, http://en.wikipedia.org/w/index/pp?title=Layered_Service_Provider&oldid=349904824.
Louw et al., "Enhancing web browser security against malware extensions", Journal in Computer Virology, vol. 4, No. 3, Aug. 1, 2008, pp. 179-195.

* cited by examiner

*Primary Examiner* — Gilberto Barron, Jr.
*Assistant Examiner* — Devin Almeida
(74) *Attorney, Agent, or Firm* — Edell, Shapiro & Finnan, LLC

(57) ABSTRACT

Systems and methods for detecting malware in a selected computer that is part of a network of computers. The approach includes inspecting a predetermined set of operational attributes of the selected computer to detect a change in a state of the selected computer. In response to a detected change in state, the selected computer is scanned to create a snapshot of the overall state of the selected computer. The snapshot is transmitted to an analytic system wherein it is compared with an aggregated collection of snapshots previously respectively received from a plurality of computers in the computer network. Based on the comparison, anomalous state of the selected computer can be identified. In turn, a probe of the selected computer is launched to gather additional information related to the anomalous state of the selected computer so that a remediation action for the anomalous state of the selected computer can be generated.

20 Claims, 4 Drawing Sheets

Probed Executed: 4/25/2008 1:27:13 PM
Result Type: Anomalous Application

High Frequency Strings:
hxdef100r
hackerdefender

Risk Assement:

| Present | Risk Factors |
|---|---|
| Yes | Autostart methods |
| - | Peer-to-Peer Utilities |
| - | Winsock protocol stack |
| - | Search page settings |
| - | Home page settings |
| - | IE default settings |
| - | Registry editing tools |
| - | Operating system integrity |
| - | Default URL prefixes |
| - | Control panel applets |
| - | IE control restrictions |
| - | File associations |
| Yes | Uninstaller missing |
| Yes | Unusual install location |
| Yes | Internet connectivity |
| - | Process injection |
| - | File injection |
| Yes | Corrupted system calls |
| Yes | Unusual service |
| - | Safe mode addition |

FIG.3

AUTOMATED MALWARE DETECTION AND REMEDIATION

FIELD OF THE INVENTION

The present invention relates to systems and methods for automated anomaly, and particularly malware, detection and remediation.

BACKGROUND OF THE INVENTION

Management of a computer network, even a relatively small one, can be daunting. A network manager or administrator is often responsible for ensuring that users' computers are operating properly in order to maximize productivity and minimize downtime. When a computer begins to function erratically, or ceases to function altogether, a user will often contact a system administrator for assistance. As explained in U.S. Pat. No. 7,593,936, entitled "Systems and Methods for Automated Computer Support," there are significant labor costs associated with investigating, diagnosing, and resolving problems associated with individual computers on a computer network.

There may be any number of reasons why a given computer is not working properly, including missing or corrupted file(s) or registry key(s), "malware" (including viruses and the like), as well as user-error. Unfortunately, it is not uncommon that an information technology (IT) department of a typical organization lacks the resources or ability to receive notice of a reported problem regarding a given computer, thereafter investigate the same to identify a root cause of the problem, and then implement an appropriate fix/repair/correction for the given computer. As a result, instead of delving into the details of most reported computer problems, network managers and IT departments often resort to three common "brute force" methodologies to address reported problems:

Backups, wherein a full system or application is replaced with a previously stored backed-up version;

Golden Image, wherein all applications and data are reset back to a baseline configuration; and/or Re-imaging, wherein, perhaps, the latest versions of software are (re-)installed, anew, on the computer.

The foregoing "brute force" approaches to computer problem remediation, as those skilled in the art will appreciate, amount to blanket data replacement methodologies that are not responsive to fixing, e.g., a singular, specific problem on a given computer and, moreover, often result in many undesirable side effects for the computer user. For example, the user may experience loss of user customized settings, may have to work through a lengthy downtime period, or may wind up losing user data.

Among the reasons why a selected computer might not be operating properly, malware is increasingly becoming the culprit. As computer users spend more time using the Internet and downloading files, programs, and other materials, malware increasingly finds its way onto the computers. Particularly troubling is the fact that malware is always a "moving target" in that unscrupulous people are continually changing and modifying malware functionality and how the troublesome applications present themselves to those trying to detect them.

Because of the "moving target" nature of malware, the dominant detection approach, namely signature analysis, is not particularly effective. Signature analysis works by having an agent scan incoming files for sequences of bytes that match known malware. The weaknesses of this technology include the following:

Prior knowledge of the malware is required to create a signature. If the malware is new, then the technology can be entirely ineffective. Widespread availability of automated toolkits for creating malware is increasing the frequency of new malware types;

The time from initial discovery to a deployed signature can be many days depending on the responsiveness of the antivirus vendor and the speed of deployment; and The number of signatures is currently growing exponentially, eroding the resources and performance of the computer being detected.

In light of the often critical importance of maintaining user data and avoiding unnecessary downtime, and the increasingly ineffectiveness of signature based approaches, there is a need to provide tools for computer anomaly detection, and particularly malware detection, and remediation.

SUMMARY OF THE INVENTION

Described here are systems and methods for detecting malware in a selected computer that is part of a network of computers. The approach includes inspecting a predetermined set of operational attributes of the selected computer to detect a change in a state of the selected computer. In response to a detected change in state, the selected computer is scanned to create a snapshot of the overall state of the selected computer. The snapshot is transmitted to an analytic system wherein it is compared with an aggregated collection of snapshots previously respectively received from a plurality of computers in the computer network. Based on the comparison, an anomalous state of the selected computer can be identified. To avoid detection of a "false positive" anomalous state, the anomaly set may be first passed through a set of generic recognition filters that determine if the anomalies that have been identified are consistent with the presence of a potential threat. Recognition filters map patterns of anomalies to functional impacts and are intended to eliminate from consideration harmless anomalies that may be generated during normal use of the computer.

Assuming the recognition filters do not eliminate the identification of the anomalous state as a false positive, a probe of the selected computer is then launched to gather additional information related to the anomalous state of the selected computer so that a remediation action for the anomalous state of the selected computer can be generated. Remediation might include removing suspicions code or data.

In a preferred embodiment, near real time monitoring is achieved by inspecting the attributes at least once every 1 minute, for example. Inspecting may include inspecting registry keys, running processes, open ports, performance counters or security settings of the computer. More generally, inspecting is intended to encompass looking for changes in a designated set of "sensitive" attributes, i.e. attributes that control important functions within the managed computer. These sensitive attributes may vary depending on the operating system and can change over time as operating systems change.

In one implementation, inspecting includes inspecting for an auto-start mechanism, which is often associated with malware applications.

In an effort to maintain near real time response times, the approach includes queuing the snapshot for comparison with the aggregated collection of snapshots ahead of other snapshots that were not generated as a result of a detected change in state of a computer. Such other snapshots may be merely regularly schedule snapshots and thus not be in need of more urgent analysis.

When the anomalous state of the selected computer is determined to be caused by an anomalous application (e.g., malware), the methodology provides for displaying, via a user interface, details associated with the anomalous application (which may be provided by the probe). The user interface preferably displays, among other things, any high frequency strings associated with the anomalous application. As well, the user interface may present a correlated list of related anomalies and a list of observed characteristics that can be used as a form of risk assessment.

These and other features of embodiments of the present invention and their attendant advantages will be more fully appreciated upon a reading for the following detailed description in conjunction with the associated drawings.

BRIEF DESCRIPTION OF THE DRAWINGS

FIG. 3 depicts an example screen of a user interface showing results of a probe in accordance with an embodiment of the invention.

DETAILED DESCRIPTION

Computer problems, and in particular those caused by malware, continue to plague computer users and information technology (IT) professionals. Presently, even anti-virus vendors themselves are finally admitting that "signature-based" anti-malware technology is declining in its effectiveness, and security conscious customers are being forced to consider alternative technologies to shore up their defenses. In particular, customers are worried about targeted and zero-day attacks for which signatures do not exist. Embodiments of the present invention detect and remediate a variety of malicious and undesirable applications, even applications used in targeted and zero-day attacks.

For purposes of the following discussion, the term "malware" is meant to encompass applications that are destructive, propagate automatically, and/or enable unauthorized access to information. "Malware" is also meant to encompass undesirable applications and unauthorized applications. Undesirable applications include toolbars, browser helper objects, and adware. These programs are in many cases not detected by conventional anti-virus products, but may still be problematic. Unauthorized applications are perfectly legitimate software tools (e.g. Skype, Instant Messenger), but may not be approved for use within a particular information technology (IT) environment.

Figure 1:
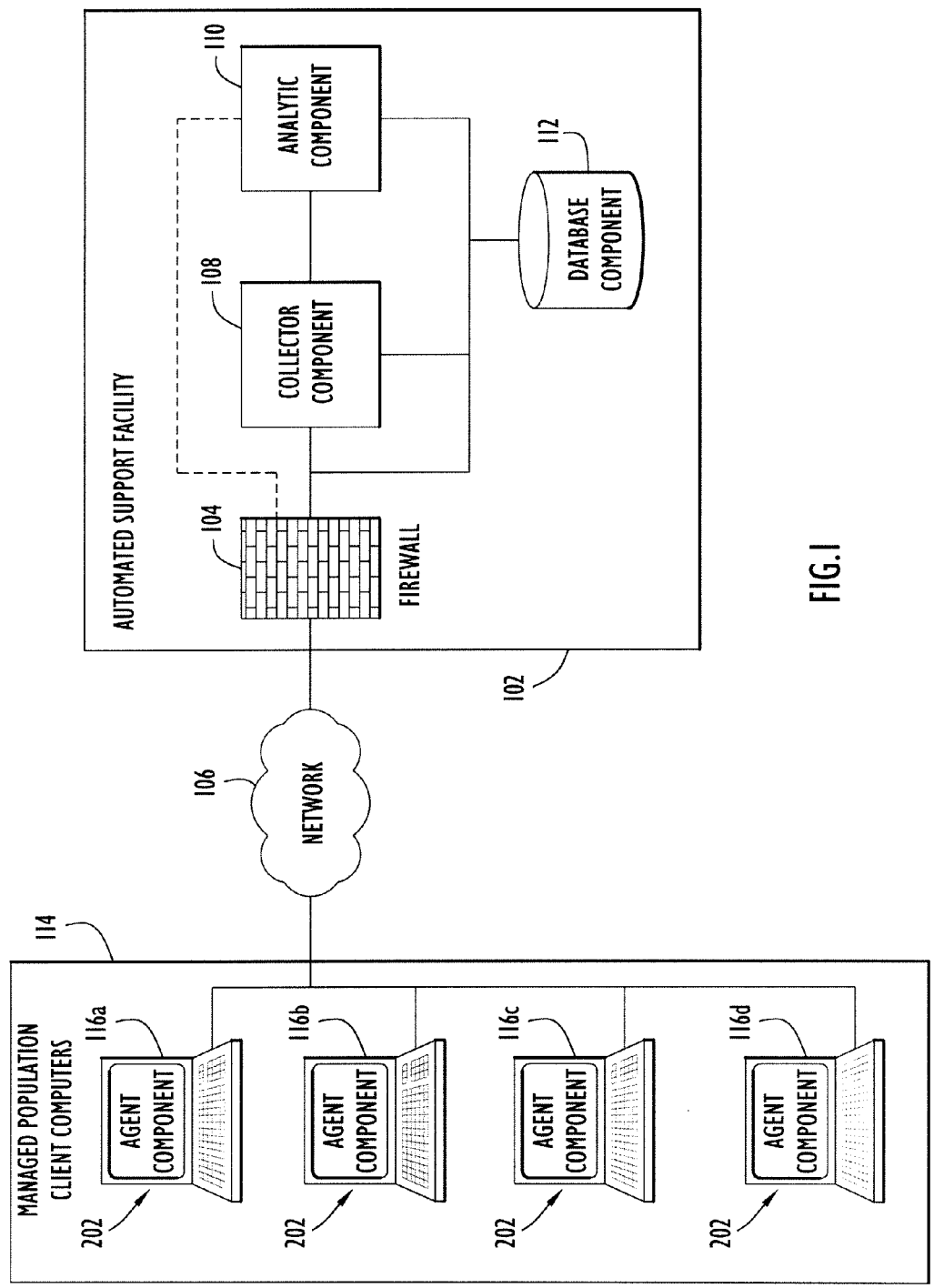
FIG. 1 illustrates an exemplary environment in which an embodiment of the present invention may operate.

Referring now to the drawings in which like numerals indicate like elements throughout the several figures, FIG. 1 is a block diagram illustrating an exemplary environment in which an embodiment of the present invention may operate. This environment and configuration is described in detail in U.S. Pat. No. 7,593,936, which is incorporated herein by reference in its entirety.

FIG. 1 shows an automated support facility 102. Although the automated support facility 102 is shown as a single facility in FIG. 1, it may comprise multiple facilities or be incorporated into a site where a managed population of computers 114 or network of computers resides. The automated support facility 102 may include a firewall 104 that is in communication with a network 106 for providing security to data stored within the automated support facility 102. The automated support facility 102 may also include a Collector component 108. The Collector component 108 may provide, among other features, a mechanism for transferring data in and out of the automated support facility 102 using, e.g., a standard protocol such as file transfer protocol (FTP) or hypertext transfer protocol (HTTP), or a proprietary protocol. Data in the form of, e.g., XML, may be passed in and out of the automated support facility 102. The Collector component 108 may also provide processing logic necessary to download, decompress, and parse incoming data, including "snapshots."

The automated support facility 102 may also include an Analytic component 110 in communication with the Collector component 108 and/or directly with network 106, and thus also a managed population of computers 114. The Analytic component 110 may include hardware and software for creating and operating on an aggregated collection of snapshots previously respectively received from a plurality of computers 116a-d in the managed population 114. Such an aggregated collection of snapshots may be, for example, an "adaptive reference model" as described in detail in U.S. Pat. No. 7,593,936 and described herein for context.

Database component 112, which may be in communication with both Collector component 108 and Analytic component 110 may be used to store the adaptive reference model(s). The Analytic component 110 is configured to extract an adaptive reference model and snapshot from Database component 112 (or Collector component 108 depending on the specific implementation), analyze the snapshots in the context of the reference model, identify and filter any anomalies, and transmit response agent(s) (FIG. 2) when appropriate, all of which will be explained in more detail below. The Analytic component 110 may also provide a user interface for the system.

FIG. 1 shows only one Collector component 108, one Analytic component 110, and one Database component 112. However, those skilled in the art will appreciate that other possible implementations may include many such components, networked together as appropriate.

Embodiments of the present invention provide automated support and remediation to a managed population of computers 114 that may comprise a plurality of client computers 116a-d. Those skilled in the art will appreciate that the four client computers 116a-d shown are illustrative only, and that embodiments of the present invention may operate in the context of computer networks having hundreds, thousands or even more of client computers. The managed population 114 provides data to the automated support facility 102 via the network 106 using respective Agent components 202.

More specifically, an Agent component 202 is deployed within each monitored computer 116a-d and gathers data and operates on data from its respective computer. For example, at scheduled intervals (e.g., once per day), in response to an "on-demand" command from the Analytic component 110, or in response to a triggering event caused by the Agent component 202 itself, the Agent component 202 takes a detailed "snapshot" of the state of the machine in which it resides. This snapshot may include a detailed examination of all system files, designated application files, the registry, performance counters, processes, services, communication ports, hardware configuration, and log files. The results of each scan, the "snapshot," are then (optionally) compressed and transmitted to Collector component 108/Analytic component 110/Database component 112.

Each of the devices (e.g., servers, computers, and network components) shown in FIG. 1 may comprise processors and computer-readable media. As is well-known to those skilled in the art, an embodiment of the present invention may be configured in numerous ways by combining multiple functions into a single computer or alternatively, by utilizing multiple computers to perform a single task.

The processors utilized by embodiments of the present invention may include, for example, digital logic processors capable of processing input, executing algorithms, and generating output as necessary in support of processes according to the present invention. Such processors may include a microprocessor, an ASIC, and/or state machines. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C#, C++, Visual Basic, Java, and JavaScript.

Figure 2:
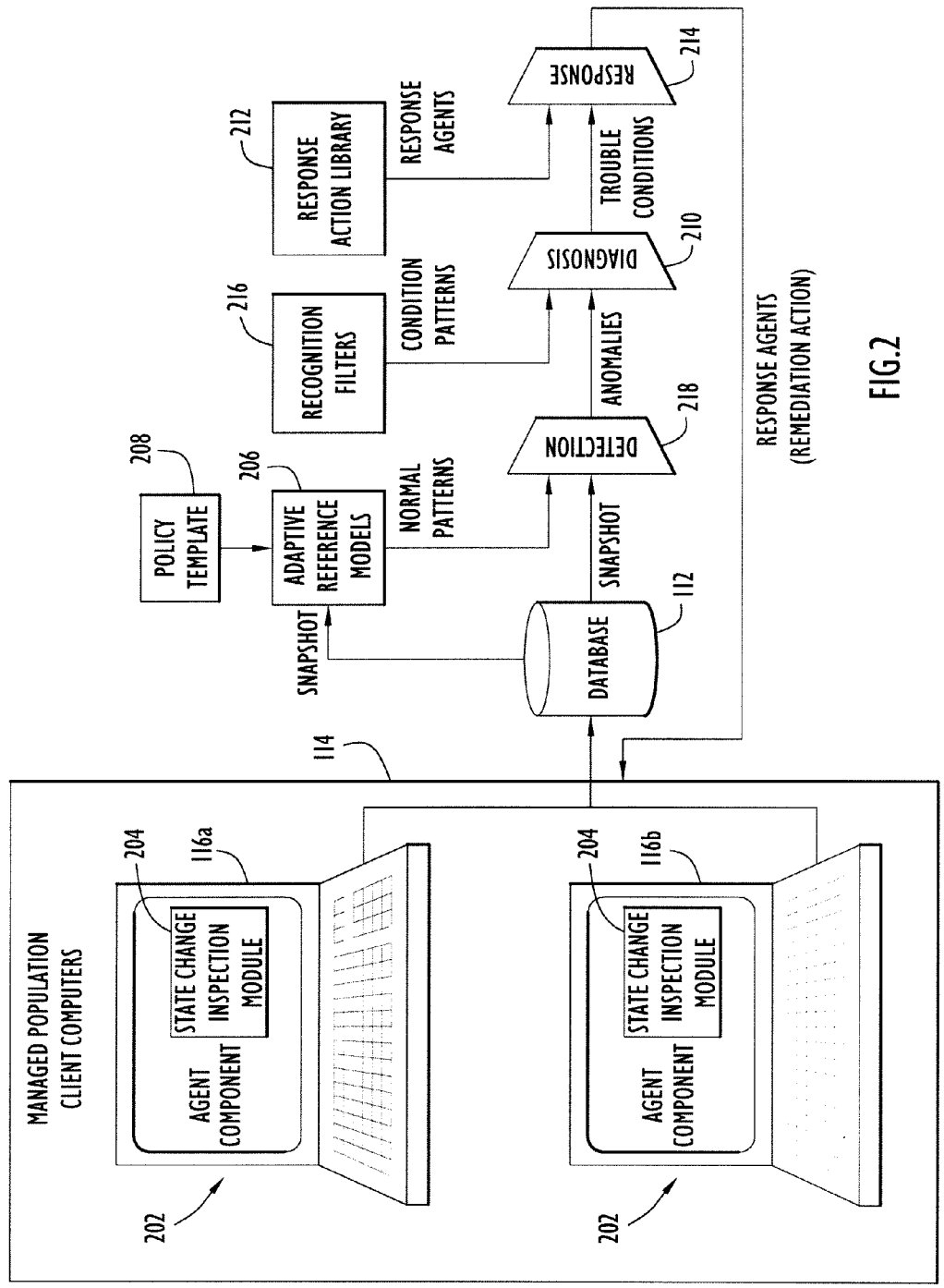
FIG. 2 is a block diagram illustrating a flow of information and actions in accordance with an embodiment of the present invention.

FIG. 2 provides additional context with respect to snapshot analysis. Those skilled in the art will appreciate that embodiments of the present invention do not necessarily need to implement the same sort of snapshot analysis described herein and in U.S. Pat. No. 7,593,936. On the other hand, the granularity of problem detection that is made possible by implementing such a snapshot analysis methodology may help to further leverage the benefits of the malware remediation techniques described herein.

FIG. 2 is a block diagram illustrating a flow of information in connection with an embodiment of the invention. The embodiment shown comprises, as shown in FIG. 1, an Agent component 202, which may perform several functions. First, it may be responsible for gathering data by scanning the client machine 116 at scheduled intervals, in response to a command from the Analytic component 110, or in response to events of interest detected by the Agent component 202 itself. In a particular, a state change inspection module 204 may be provided for inspecting predetermined attributes, settings, etc. and when one such attributes changes, a full scan of the computer may ensue. As mentioned, the scan may include a detailed examination of all system files, designated application files, the registry, performance counters, hardware configuration, logs, running tasks, services, network connections, and other relevant data. The results of each scan may, as already indicated, be compressed and transmitted over a network in the form of a snapshot to the Collector component 108, etc.

In one embodiment, the Agent component 202 reads every byte of files to be examined and creates a digital signature or hash for each file. The digital signature identifies the exact contents of each file rather than simply providing metadata, such as the size and the creation date. This can be particularly helpful in that some conventional malware can change the file header information of a given file in an attempt to fool systems that rely on metadata for malware detection. The digital signature methodology that may be implemented in connection with the present invention is thus still able to successfully detect such malware.

The scan of the client computer 116 by the Agent component 202 may be resource intensive. Accordingly, in one embodiment, a full scan is performed periodically, e.g., daily, during a time when the user may not be using the client machine. In another embodiment, the Agent component 202 performs a delta-scan of the client machine, logging only the changes from the last scan. In still another embodiment, scans by the Agent component 202 are executed on demand, providing a valuable tool for a technician or support person attempting to remedy an anomaly or reported problem on the client machine. Automated on demand execution can be particularly important in a zero-day malware attack.

A second major function performed by the Agent component 202 is that of behavior blocking. For example, the Agent component 202 may constantly (or substantially constantly) monitor access to key system resources such as system files and the registry and, where appropriate, selectively block access to these resources in real time to prevent damage from malicious software. While behavior monitoring may occur on an ongoing basis, behavior blocking may be enabled as part of a repair action. For example, if the Analytic component 110 suspects the presence of a virus, it can download a repair action to cause the client, via the Agent component 202, to block the virus or malware from accessing key information resources within the managed system.

A third function performed by the Agent component 202 is to provide an execution environment for "response actions." Response actions may be commands that are understood by Agent component 202 or may be more comprehensive "mobile software components" that implement automated procedures to address various types of trouble conditions. For example, if the Analytic component 110 suspects the presence of a virus or malware, it can download a response action to cause the Agent component 202 to remove the suspicious code or data from the managed system. The Agent component 202 may run as a service or other background process on the computer being monitored. Because of the scope and granularity of information provided by embodiments of the present invention, repair can be performed more accurately than with conventional systems.

As further shown in FIG. 2, an embodiment of the present invention may include an adaptive reference model component 206, which may provide or generate an aggregated collection of snapshots. More specifically, the adaptive reference model 206 is used to analyze snapshots from many computers and identify statistically significant patterns. Once a reference is established, one or more sample snapshots can be used to determine if anything abnormal is occurring within the entire population or any member of the population.

A Policy Template component 208 allows the service provider to manually insert rules in the form of "policies" into the adaptive reference model. Policies are combinations of attributes (files, registry keys, etc.) and values that when applied to a model, override a portion of the statistically generated information in the model. This mechanism can be used to automate a variety of common maintenance activities such as verifying compliance with security policies and checking to ensure that the appropriate software updates have been installed.

As part of the information flow of FIG. 2, there is further provided a Detection module 218 that is arranged to receive given ones of snapshots and to detect an anomaly in the snapshot as compared to "normal" patterns provided by a given adaptive reference model. An anomaly, as used herein, may be defined as an unexpectedly present asset, an unexpectedly absent asset, or an asset that has an unknown value. Anomalies may be matched against a library of Recognition Filters 216 via a Diagnosis module 210. A Recognition Filter 216 comprises a particular pattern of anomalies that indicates the presence of a particular root cause condition or a generic class of conditions. Recognition Filters 216 may also associate conditions with a severity indication, a textual description, and a link to a response agent. In another embodiment, a Recognition Filter 216 can be used to identify and interpret benign anomalies. For example, if a user adds a new application that an administrator is confident will not cause any problems, the system according to the present invention will still report the new application as a set of anomalies. If the application is new, then reporting the assets that it adds as anomalies is correct. However, the administrator can use a Recognition Filter 216 to interpret the anomalies produced by adding the application as benign.

If an anomaly is matched to a known condition using a recognition filter, a root cause of a problem may then be known. With that information, namely a Trouble Condition, a Response module 214, in combination with a Response Action Library 212, can be used to select an appropriate response action to return to Agent component 202 resident on the computer that has been identified as having anomalous data. Further details regarding adaptive reference module development and use can be found in U.S. Pat. No. 7,593,936. In sum, whether it is via use of an adaptive reference model, or some other means, a necessary element of the present invention is to provide some form of aggregated collection of snapshots previously received from a plurality of computers in the computer network to which a new snapshot can be compared.

As mentioned, zero-day type malware attacks are difficult to detect using conventional approaches. In order to address such attacks, both real time detection and automated malware analysis and remediation are provided in embodiments of the present invention.

Real Time Detection

An overall strategy for achieving near real time recognition of malware is to allow the Agent 202 to trigger an on-demand snapshot upon detecting evidence that a new application of a suspicious nature has been installed. An example process flow is summarized below.

1. A malware application is installed.

2. The Agent 202 periodically scans or inspects for changes that indicate the presence of malware. Such changes can include, e.g., a new auto-start mechanism, network connections to seldom used ports, and weakened security configuration settings, among other possibilities.

3. When the Agent 202 detects a new auto-start mechanism or other indication, it sends a request for an on-demand scan. The request may be received at the automated support facility 102.

4. The automated support facility 102 may, in response, order the Agent 202 to perform an on-demand scan. A resulting snapshot, when received, is analyzed as soon as possible and, as such, may preferably be queued prior to or separately from other snapshots awaiting analysis, where those other snapshots did not result from a triggered on-demand scan.

5. If any known malware is recognized and the system has been configured to allow automatic remediation, then the appropriate remediation response is synthesized and launched.

6. The Agent 202 executes the remediation response and removes the malicious application.

Items or attributes that are polled or inspected include, but are not limited to, registry keys, running processes, open ports, performance counters, security settings, files and/or memory objects. Table 1 below provides a more specific list of example attributes that can be polled or inspected at regular intervals by the Agent 202. Many more or fewer items or attributes can be monitored depending the configuration desired. This list may be maintained by the Agent 202. The polling or inspection is set to work in near real time, which in this case is preferably less than one minute, though higher or lower periodicity may be implemented. Referencing Table 1, if an attribute changes in the manner indicated in the Change Trigger column, then the Agent 202 requests an on-demand snapshot. In one implementation, when an on-demand snapshot is pending or in progress, the Agent 202 does not request another on-demand snapshot.

Under normally operation, the Agent 202 submits a snapshot only when ordered to do so by the automated support facility 102. When such an order is issued, it is accompanied by a scan throttle setting that tells the Agent 202 how quickly it should attempt to prepare and submit the snapshot. An "on-demand" snapshot is one that is executed at maximum speed. Having the automated support facility 102 dictate when a snapshot can be submitted and how quickly it can be executed enables centralized flow control which can be important during situations where malware is rapidly propagating through many managed computers. This approach also provides the option for the automated support facility 102 to quickly analyze a specific change and determine if it is unusual before granting a request for an on-demand snapshot.

TABLE 1

| Attribute | Change Trigger |
|---|---|
| [%]systemdrive[%]\documents and settings\%\start menu\programs\startup\% | Files added |
| [%]systemroot[%]\downloaded program files\% | Files added |
| [%]systemroot[%]\tasks\% | Files added |
| [%]systemroot[%]\winstart.bat | File changed |
| [%]systemroot[%]\system.ini | File changed |
| [%]systemroot[%]\system32\config.nt | File changed |
| [%]systemroot[%]\explorer.exe | File changed |
| [%]systemroot[%]\system32\autoexec.nt | File changed |
| [%]systemroot[%]\win.ini | File changed |
| [%]systemroot[%]\autoexec.bat | File changed |
| hklm\software\classes\*\shellex\contextmenuhandlers\% | Keys/Values added/changed |
| hklm\software\classes\folder\shellex\columnhandlers\% | Keys/Values added/changed |
| hklm\software\classes\batfile\shell\open\command\\(default) | Value changed |
| hklm\software\classes\comfile\shell\open\command\\(default) | Value changed |
| hklm\software\classes\cplfile\shell\cplopen\command\\(default) | Value changed |
| hklm\software\microsoft\windows nt\currentversion\winlogon\\shell | Value changed |
| hklm\software\microsoft\windows nt\currentversion\winlogon\\system | Value changed |
| hklm\software\microsoft\windows nt\currentversion\winlogon\\taskman | Value added/changed |
| hklm\software\microsoft\windows nt\currentversion\winlogon\\uihost | Value changed |
| hklm\software\microsoft\windows nt\currentversion\winlogon\\userinit | Value changed |
| hklm\software\microsoft\windows nt\currentversion\winlogon\\vmapplet | Value changed |
| hklm\software\microsoft\windows\currentversion\explorer\browserhelper objects\% | Keys/Values added/changed |
| hklm\software\microsoft\windows\currentversion\explorer\sharedtaskscheduler%  | Values added/changed |

TABLE 1-continued

| Attribute | Change Trigger |
|---|---|
| hklm\software\microsoft\windows\currentversion\explorer\shellfolders\\common startup | Value changed |
| hklm\software\microsoft\windows\currentversion\explorer\shellexecutehooks% | Keys/Values added/changed |
| hklm\software\microsoft\windows\currentversion\explorer\usershell folders\\common startup | Value changed |

Under normal circumstances all incoming snapshots are queued and processed sequentially. However, such an approach would mean that an on-demand snapshot may have to wait many minutes in a queue, possibly containing thousands of scheduled snapshots, before it is inserted and compared in the database. To achieve near real time malware detection, the Collector component 108 preferably operates so that on-demand snapshots are queued separately from scheduled snapshots or in some other suitable manner, such that on-demand snapshots are processed before processing any of the snapshots in the scheduled queue. To operate in the near real time, the interval between receiving an on-demand snapshot and completing processing of that snapshot within the Analytic component 110 is preferably averages less than one minute, assuming no other on-demand snapshots are already queued.

A significant value of an anomaly based anti-malware solution is its ability to discover and characterize instances of malware that have never been seen before, i.e. without signatures. To provide this capability in a manner that is practical for large scale IT environments, new forms of malware are analyzed automatically and with a high degree of accuracy. The strategy for achieving this objective is based on two features. First, an auto-analyze capability is invoked automatically. Second, the auto-analyze function is performed within the Agent 202 as opposed to, e.g., Analytic component 110 within automated support facility 102. Performing the auto-analyze function within the Agent 202 extends the range of relationships that can be used for correlation as well as the criteria that can be incorporated into the risk assessment leading to a more useful and reliable result. These two features give rise to the following process flow for automated malware analysis.

1. Subsequent to a post processing phase of both scheduled and on-demand checks, an additional analytic operation may be performed. This additional operation includes, for example, three tests, as follows. First, the snapshot is compared to the adaptive reference model to determine if there are any anomalous changes. Second, any anomalous changes are passed through recognition filters 216 to determine if the anomalies match a pattern associated with a known problem such as malware that has been seen before. Third, any anomalies that are not recognized as known problems, are passed through a set of generic recognition filters to identify characteristics consistent with malware. Examples of such characteristics include auto start methods, browser extensions, toolbars, and unusual Layer Service Providers (LSPs). Changes in LSPs indicate that the Winsock protocol stack has been altered. Some forms of malware inject themselves into the protocol stack to allow them to block access to security websites. In sum, the intent of these tests or additional analytic operation is to find evidence of an anomalous application that has not been recognized by a specific filter.

2. If evidence of a new anomalous application is discovered and the associated machine (computer 116) is represented in the aggregated collection of snapshots (e.g., adaptive reference model) that was used to conduct the check, a probe may be launched to the machine. This probe preferably contains the full anomaly set for the machine as well as the mapping between the anomalies and filters specified in the previous step. Generally speaking, the purpose of a probe is to gather additional information to supplement a diagnosis. In this particular case, the objective is to identify the attributes associated with the anomalous application and to assess the risk level represented by the anomalous application.

3. The Agent 202 receiving the probe uses the contents of the probe to perform an auto-analyze function. The seed for the auto-analyze function includes the attributes that match the generic filters specified in step 1. The output from the auto-analyze function comprises one or more anomalous applications. Each anomalous application comprises a set of correlated anomalies, a list of risk factors, and a list of high frequency strings (see FIG. 3). The anomalous applications identified by the probe are transmitted back to the automated support facility 102 as soon as the auto-analyze function has been completed. [More specifically, the probe performs three functions. First it uses a series of "correlating functions" to partition the anomaly set into related groups. Each correlating function is based on a particular characteristic or relationship. Some examples include code dependencies, common path names, and common strings. Iterative application of correlating functions results in a web of related anomalies. Each web or group of related anomalies is designated an "anomalous application".

The second function performed by the probe is to conduct a risk assessment of each anomalous application. A risk assessment is an enumeration of certain characteristics and behaviors that can be used to evaluate the intent and level of danger represented by an anomalous application. For example, if the anomalous application is communicating over the internet with an unknown website, then the level of risk is higher than if no such communications exist.

The third function performed by the probe is to identify frequently used strings within each anomalous application. Such strings might include the name of the anomalous application and/or provide clues to its origin.

4. Each anomalous application reported by an Agent 202 is preferably stored in the database 112. As a minimum, the database record for each anomalous application preferably includes a machine ID, a machine name, a date/time when the probe was executed, a transaction ID associated with the probe, the set of correlated anomalies, the risk assessment results, the high frequency strings, and a workflow position. This information can be presented to a user via user interface.

5. In a particular implementation, the system saves an anomalous application as an analysis result to facilitate filter construction. More specifically, when a user views an anomalous application probe result via the user interface, there are three possible courses of action. If the probe result corresponds to a known legitimate application, then the probe result can simply be deleted. When a new adaptive reference model is built, the application will be assimilated as part of the norm so that its presence will no longer be perceived as anomalous. If the probe result corresponds to an unknown application requiring further investigation, then the user can preserve the probe result in the database along with the full anomaly set for the corresponding computer. This enables subsequent evaluation by experts and the creation of a specific recognition filter to automate the response the next time a similar application is encountered. If the probe result corresponds to a known undesirable application, then the user can authorize the system to synthesize and execute a remediation response immediately.

6. In one embodiment, remediation of the anomalous application is initiated manually, via a user interface. Under these circumstances a warning message may be designed to appear before the remediation response is transmitted. The warning message might state that the requested remediation has not been tested (as the anomalous application is being seen only for the first time). The user can be offered the option to continue with the remediation or to cancel. If the user elects to continue with the remediation, then an appropriate, e.g., XML parameter file, response is prepared and sent to the Agent 202 for processing. The exact behavior of the response depends on the anomaly type. If the anomaly consists of an attribute that is unexpectedly present, then that attribute may be deleted. If the anomaly represents an attribute that is missing or exhibits an unknown value, then donor technology, where the value is requested from another computer within the managed population of computers, may be used to restore the attribute. Donor technology is described in co-pending application Ser. No. 11/970,650, entitled "Systems and Methods for Automated Data Anomaly Correction in a Computer Network," which is incorporated herein by reference in its entirety.

The key point is that no prior knowledge is required. The behavior of the remediation response is determined by the anomaly set which is in turn the result of the analysis functions performed by the adaptive reference model and the probe.

7. Probe results (e.g., indicative of an anomalous application) can be maintained for a configurable period of time after which it may be automatically removed from the database 112. A default value for this period of time may be, e.g., two weeks.

In an embodiment, each anomalous application is automatically assigned a unique name. This name can be structured to enable future support of probe results that may not be associated with anomalous applications. The name may include the transaction ID for the probe, a result ID to distinguish among multiple results from the same probe, and a result type, in this case of an anomalous application. For example, the second anomalous application discovered by a probe with transaction ID 3877 might have the name "3877-2 Anomalous Application."

A user interface may be used to present details regarding an anomalous application. An example screen of such a user interface is shown in FIG. 3. As shown, the date/time when the anomalous application was discovered is displayed, along with the results of a risk assessment, and the list of high frequency strings. Note that high frequency strings, obtained, e.g., from the probe, may be displayed as links. Clicking on one of these links causes a general Internet (e.g., world wide web) search or a more targeted search limited to predetermined security and anti-virus web sites. Those skilled in the art will appreciate, however, that such web searches may be of limited value to the extent the detected malware and associate high frequency strings may not be known to the computer security community at large.

Figure 4:
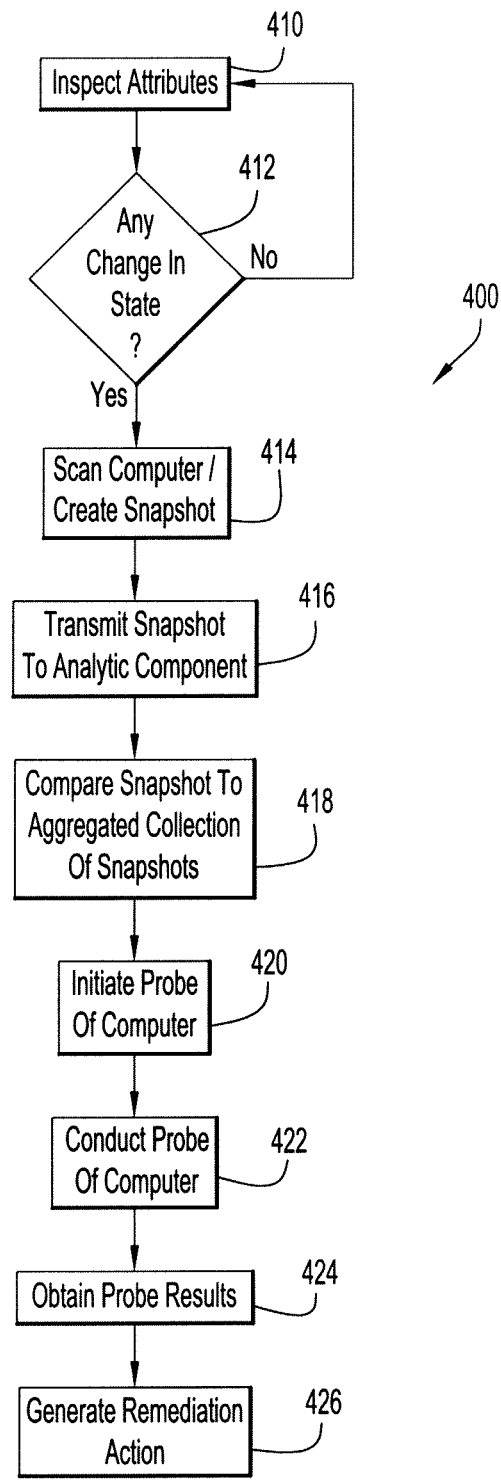
FIG. 4 depicts an example process flow for detecting and remediating malware in accordance with an embodiment of the present invention.

FIG. 4 depicts an example overall process flow 400 for detecting and remediating malware (e.g., an anomalous application) in accordance with an embodiment. Those skilled in the art will appreciate that process flow 400 describes steps associated with a single computer or machine, but that similar steps may be performed on any number of computers 116 or machines the computer network 114. At step 410, predetermined attributes of the computer are inspected. At step 412, it is determined whether any of the predetermined attributes have changed, indicating a change in state of the computer 116. If no state change is detected, the process loops back to step 410. As mentioned earlier, inspection can take place on the order of every minute to attain near real time monitoring of the computer.

If a state/attribute change is detected at step 412, then at step 414, a scan of the computer is performed, resulting in a snapshot of the full state of the computer. This scan may be initiated by Agent 202 on its own, or may be triggered by, e.g., automated support facility 102. In a particular implementation, the Agent 202 scans all the time, constantly updating its view of the state of the computer 116. Some attributes are scanned more frequently than others. For example, sensitive areas that are known to be affected by malware are scanned every 30 seconds or so, while less important areas may not be scanned more than once per day. When the Agent 202 detects a change in a sensitive area, it requests permission to submit a snapshot immediately. If the automated support facility 102 grants this request, then the Agent 202 accelerates the process of completing its current scan cycle, constructing the snapshot file, and transmitting the snapshot to the automated support facility. The subtlety in this specific implementation is that a change in a sensitive area does not really trigger a scan. Rather, it triggers the snapshot submission process that captures the current scan results.

Once the snapshot is captured, it is transmitted, at step 416, to, e.g., Analytic component 110 in the automated support facility 102. At step 418, the snapshot is compared to an aggregated collection of prior snapshots of computers (such as an adaptive reference model) from the computer network 114. Assuming an anomalous state is confirmed by the comparison, a probe of the computer is initiated at step 420. The probe is configured to obtain more detailed information associated with the anomalous state.

Probe results are returned, at step 424, to, e.g., Analytic component 110. There, a remediation action may be generated at step 426 and passed back to Agent 202 to, e.g., remove a detected anomalous application.

The systems and methods described herein may be embodied in other specific forms without departing from the spirit or essential characteristics thereof. The foregoing embodiments are therefore to be considered in all respects illustrative and not meant to be limiting.

What is claimed is:

1. A method of analyzing a selected computer, wherein the selected computer is part of a computer network, the method comprising:

inspecting a predetermined set of operational attributes of the selected computer to detect a change in a state of the selected computer, wherein the inspecting to detect a change in the state of the selected computer is performed by and on the selected computer and wherein a list of the operational attributes is stored by an agent module running on the selected computer;

in response to a detected change in state, requesting permission from a remote analytic system to conduct a scan of the selected computer by the agent module sending a request to the remote analytic system, the request including an identification of the detected change in state;

in the remote analytic system, analyzing the detected change in state to determine whether permission to scan the selected computer should be granted, and sending such permission to the agent module when a result of said analyzing so indicates;

in response to receiving permission from the remote analytic system, scanning the selected computer to create a snapshot of the state of the selected computer;

transmitting the snapshot from the selected computer to the remote analytic system;

in the remote analytic system, comparing the snapshot with an aggregated collection of snapshots previously respectively received from a plurality of computers in the computer network, and identifying, in comparison to the aggregated collection of snapshots previously respectively received from the plurality of other computers in the computer network, an anomalous state of the selected computer;

initiating, from the remote analytic system, a probe of the selected computer to gather additional information related to the anomalous state of the selected computer; and receiving the additional information and, based thereon, generating a remediation action for the anomalous state of the selected computer.

2. The method of claim 1, wherein inspecting occurs at least every 1 minute.

3. The method of claim 1, wherein inspecting comprises inspecting registry keys, running processes, open ports, performance counters, security settings, files or memory objects.

4. The method of claim 1, wherein inspecting comprises inspecting for an autostart mechanism.

5. The method of claim 1, further comprising processing the snapshot for comparison with the aggregated collection of snapshots ahead of another snapshot that was not a result of a detected change in state.

6. The method of claim 1, further comprising determining that the anomalous state of the selected computer is a result of malware.

7. The method of claim 1, wherein the anomalous state of the selected computer is determined to be caused by an anomalous application, the method further comprising displaying, via a user interface, details associated with the anomalous application.

8. The method of claim 7, further comprising displaying at least one high frequency string associated with the anomalous application.

9. The method of claim 8, further comprising displaying the at least one high frequency string as a selectable link.

10. The method of claim 9, further comprising initiating a search of the World Wide Web for the at least one high frequency string when the link is selected.

11. The method of claim 1, further comprising transmitting the remediation action to an agent installed on the selected computer.

12. The method of claim 1, further comprising monitoring for browser application extensions, toolbars, or modifications to Layered Service Providers (LSPs).

13. The method of claim 1, further comprising identifying statistically significant patterns among the respective snapshots in the aggregated collection of snapshots previously respectively received from a plurality of computers in the computer network.

14. A malware detection system, comprising:
a support facility in communication with a computer network;
an agent component installed on a computer in the computer network; and
a state change inspection module associated with the agent component, the state change inspection module configured to inspect a predetermined set of attributes of the computer and, when a change to one of the attributes is detected, initiate a request including an identification of the change to one of the attributes, to the support facility, for an on-demand scan of a state of the computer, wherein the state change inspection module is configured to store a list of the predetermined set of attributes;
the support facility being configured to perform analysis of the change to one of the attributes to determine whether to grant permission for the on-demand scan of the state of the computer, and to send such permission to the agent component when a result of said analysis so indicates;
the agent component configured to perform, upon receipt of permission responsive to the request, the on-demand scan resulting in a snapshot of the state of the computer, receive instructions to perform a probe of an identified anomaly determined from an analysis of the snapshot, and perform a remedial action with respect to the anomaly upon receipt of instructions to do so.

15. The system of claim 14, wherein the instructions to perform the probe are received from the support facility.

16. The system of claim 14, further comprising a user interface configured to display information regarding the anomaly.

17. The system of claim 16, wherein when the anomaly is determined to be an anomalous application, the user interface is configured to display probe results including at least one high frequency string associated with the anomalous application, a risk assessment of the anomalous application, or a list of correlated anomalies.

18. The system of claim 17, wherein the user interface is configured to display the high frequency string as a selectable link.

19. The system of claim 17, wherein the remedial action is based on the correlated anomalies.

20. The method of claim 1, further comprising determining, by the agent module, whether the step of scanning the selected computer is pending or is already taking place and, as a result, refraining from requesting permission to conduct the scan.

* * * * *